United States Patent
Xue et al.

(10) Patent No.: US 10,256,534 B2
(45) Date of Patent: Apr. 9, 2019

(54) TERMINAL

(71) Applicant: Huawei Technologies Co., Ltd., Shenzhen (CN)

(72) Inventors: Liang Xue, Shanghai (CN); Dong Yu, Shanghai (CN); Hanyang Wang, Reading (GB); Jiaqing You, Shanghai (CN); Kun Feng, Shanghai (CN); Rui Zhang, Shanghai (CN); Meng Hou, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/560,405

(22) PCT Filed: Mar. 30, 2015

(86) PCT No.: PCT/CN2015/075390
§ 371 (c)(1),
(2) Date: Sep. 21, 2017

(87) PCT Pub. No.: WO2016/154851
PCT Pub. Date: Oct. 6, 2016

(65) Prior Publication Data
US 2018/0069306 A1 Mar. 8, 2018

(51) Int. Cl.
*H01Q 1/44* (2006.01)
*H01Q 1/24* (2006.01)
(Continued)

(52) U.S. Cl.
CPC ............. *H01Q 1/44* (2013.01); *H01Q 1/243* (2013.01); *H01Q 13/106* (2013.01);
(Continued)

(58) Field of Classification Search
CPC ........ H01Q 13/106; H01Q 1/44; H01Q 1/243; H01Q 21/28
(Continued)

(56) References Cited

U.S. PATENT DOCUMENTS 6,961,022 B1 * 11/2005 Tay .................. H01Q 9/0442
343/700 MS
8,489,162 B1   7/2013 Dou et al.
(Continued)

FOREIGN PATENT DOCUMENTS

CN    103178344 A    6/2013
CN    103401059 A    11/2013
(Continued)

*Primary Examiner* — Lam T Mai
(74) *Attorney, Agent, or Firm* — Leydig, Voit & Mayer, Ltd.

(57) ABSTRACT

A terminal is disclosed, wherein a metal back cover of the terminal includes a slot. The slot divides the metal back cover into two parts. One of the two parts is used as an antenna radiator. The antenna radiator includes a signal feed point, a first ground point, and at least one second ground point, so that an antenna of the terminal has four resonance points. The signal feed point is connected to a matching network, the first ground point is grounded by a switch device, and the second ground point is grounded. A distance between the signal feed point and the first ground point is less than a distance between the signal feed point and the second ground point, and none of the signal feed point, the first ground point, and the second ground point is located in an end of the slot.

11 Claims, 5 Drawing Sheets

(51) Int. Cl.
*H01Q 13/10* (2006.01)
*H01Q 21/28* (2006.01)
H01Q 9/04 (2006.01)
H04B 1/3888 (2015.01)
H04M 1/02 (2006.01)

(52) U.S. Cl.
CPC ........... *H01Q 21/28* (2013.01); *H01Q 9/0421* (2013.01); *H04B 1/3888* (2013.01); *H04M 1/026* (2013.01)

(58) Field of Classification Search
USPC .................................. 343/746, 767, 700 MS
See application file for complete search history.

(56) References Cited

U.S. PATENT DOCUMENTS

| | | | | |
|---|---|---|---|---|
| 9,627,743 | B2* | 4/2017 | Jung | ....................... H01Q 1/243 |
| 2011/0248891 | A1* | 10/2011 | Han | .......................... H01Q 1/40 343/700 MS |
| 2012/0154224 | A1 | 6/2012 | Kuo et al. | |
| 2014/0022125 | A1* | 1/2014 | Zhu | ..................... H01Q 3/2611 342/377 |
| 2014/0125528 | A1 | 5/2014 | Tsai et al. | |
| 2015/0057054 | A1 | 2/2015 | Su et al. | |
| 2015/0145731 | A1 | 5/2015 | Jhang et al. | |
| 2015/0263414 | A1* | 9/2015 | Chun | ..................... H01Q 1/243 343/767 |
| 2016/0134321 | A1 | 5/2016 | Yan | |
| 2017/0207515 | A1* | 7/2017 | Li | ........................... H01Q 1/44 |
| 2017/0256845 | A1 | 9/2017 | Tsai et al. | |

FOREIGN PATENT DOCUMENTS

| | | |
|---|---|---|
| CN | 203466294 U | 3/2014 |
| CN | 103700925 A | 4/2014 |
| CN | 103811863 A | 5/2014 |
| CN | 203747027 U | 7/2014 |
| CN | 204216212 U | 3/2015 |
| CN | 104659483 A | 5/2015 |

* cited by examiner

TERMINAL

CROSS-REFERENCE TO RELATED APPLICATIONS

This application is a national stage of International Application No. PCT/CN2015/075390, filed on Mar. 30, 2015, which is hereby incorporated by reference in its entirety.

TECHNICAL FIELD

The present invention relates to the field of communications technologies, and in particular, to a terminal.

BACKGROUND

A terminal on a mobile communications network sends and receives a signal by using a terminal antenna. With technical development and application, bandwidth of the terminal antenna needs to cover more frequency bands, that is, the terminal antenna needs to have more resonance points.

However, in pursuit of aesthetics, increasing metal materials are added to an exterior of the terminal, such as an all-metal back cover. For the antenna, the metal materials severely affect the bandwidth, worsen performance, and cause difficulty in design of the terminal antenna. In the prior art, whether in a low-frequency or high-frequency operating state, an antenna of a terminal with a metal back cover can generate a relatively small quantity of resonance points, and bandwidth of the terminal antenna is relatively narrow.

SUMMARY

Embodiments of the present invention provide a terminal, so as to extend bandwidth of a terminal antenna.

According to a first aspect, a terminal is provided. A metal back cover of the terminal has a slot, the slot divides the metal back cover into two parts, and one of the two parts is used as an antenna radiator of the terminal. The antenna radiator has a signal feed point, a first ground point, and at least one second ground point, so that an antenna of the terminal has four resonance points.

The signal feed point is connected to a matching network, the first ground point is grounded by using a switch device, and the second ground point is grounded. A distance between the signal feed point and the first ground point is less than a distance between the signal feed point and the second ground point, and none of the signal feed point, the first ground point, and the second ground point is located in a position, corresponding to an end of the slot, on the antenna radiator.

With reference to the first aspect, in a first possible implementation manner, the second ground point of the antenna radiator is specifically grounded by using an adjustable device.

With reference to the first aspect, in a second possible implementation manner, the second ground point of the antenna radiator is specifically grounded by using a fixed capacitor and/or a fixed inductor.

With reference to the first aspect, the first possible implementation manner of the first aspect, or the second possible implementation manner of the first aspect, in a third possible implementation manner, the antenna radiator further has a third ground point, the third ground point is grounded, and the third ground point is located in the position, corresponding to the end of the slot, on the antenna radiator.

With reference to the third possible implementation manner of the first aspect, in a fourth possible implementation manner, the third ground point of the antenna radiator is specifically grounded by using an adjustable device.

With reference to the third possible implementation manner of the first aspect, in a fifth possible implementation manner, the third ground point of the antenna radiator is specifically grounded by using a fixed capacitor and/or a fixed inductor.

With reference to the first aspect, the second possible implementation manner of the first aspect, the third possible implementation manner of the first aspect, the fourth possible implementation manner of the first aspect, or the fifth possible implementation manner of the first aspect, in a sixth possible implementation manner, the first ground point of the antenna radiator is specifically grounded by using an inductor and/or a capacitor, and the switch device.

With reference to the first aspect, the second possible implementation manner of the first aspect, the third possible implementation manner of the first aspect, the fourth possible implementation manner of the first aspect, the fifth possible implementation manner of the first aspect, or the sixth possible implementation manner of the first aspect, in a seventh possible implementation manner, the matching network connected to the signal feed point of the antenna radiator is specifically a variable capacitor.

According to the terminal provided by the first aspect, a metal back cover of the terminal has a slot, the slot divides the metal back cover into two parts, one of the two parts is used as an antenna radiator of the terminal, and the antenna radiator has a signal feed point, a first ground point that is relatively close to the signal feed point, and a second ground point that is relatively distant from the signal feed point; and the signal feed point is connected to a matching network, the first ground point is grounded by using a switch device, the second ground point is grounded, and none of the signal feed point, the first ground point, and the second ground point is located in a position, corresponding to an end of the slot, on the antenna radiator. With use of the terminal provided by the embodiments of the present invention, no matter whether a terminal antenna is in a low-frequency or high-frequency operating state, the terminal antenna can have totally four resonance points: one resonance point in a left-handed mode and three resonance points in a slot mode. Compared with the prior art, bandwidth of the terminal antenna is wider.

BRIEF DESCRIPTION OF DRAWINGS

The drawings are provided to further understand the present invention, and they constitute a part of the application. The drawings, along with the embodiments of the present invention, are used to explain the present invention, and pose no limitation on the present invention. In the drawings.

DESCRIPTION OF EMBODIMENTS

To provide an implementation solution for extending bandwidth of a terminal antenna, embodiments of the present invention provide a terminal. The following describes the embodiments of the present invention with reference to the accompanying drawings in the specification. It should be understood that the preferred embodiments described herein are merely for describing and explaining the present invention, but are not intended to limit the present invention. Moreover, the embodiments in this application and the features in the embodiments can be mutually combined when no conflict is caused.

Figure 1:
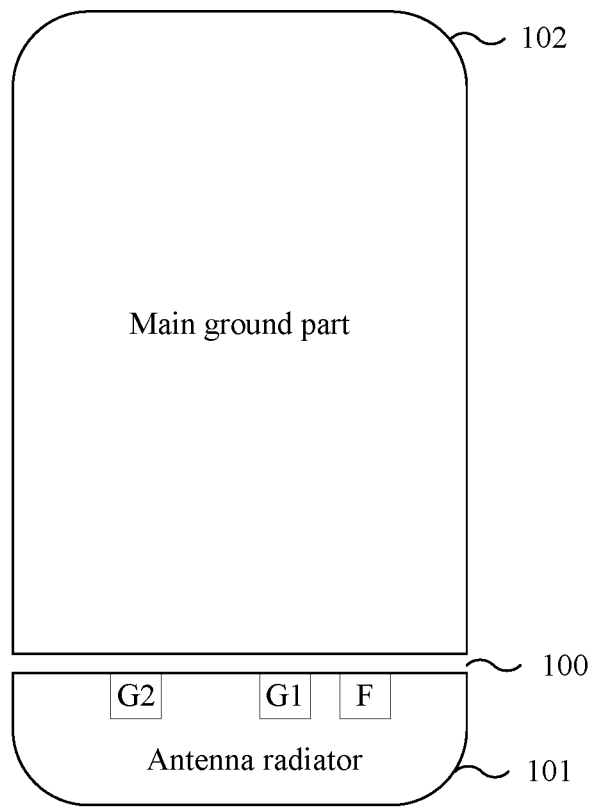
FIG. 1 is a first schematic diagram of a terminal according to an embodiment of the present invention.

An embodiment of the present invention provides a terminal. As shown in FIG. 1, a metal back cover of the terminal has a slot 100. The slot 100 divides the metal back cover into two parts. One of the two parts is used as an antenna radiator 101 of the terminal, and the other one is used as a main ground part 102. The antenna radiator 101 has a signal feed point F, a first ground point G1, and at least one second ground point G2, so that an antenna of the terminal has four resonance points.

The signal feed point F is connected to a matching network, the first ground point G1 is grounded by using a switch device, and the second ground point G2 is grounded. A distance between the signal feed point F and the first ground point G1 is less than a distance between the signal feed point F and the second ground point G2, and none of the signal feed point F, the first ground point G1, and the second ground point G2 is located in a position, corresponding to an end of the slot 100, on the antenna radiator 101. The end of the slot 100 is a position in which the slot 100 and a side frame of the terminal are connected.

Figure 2:
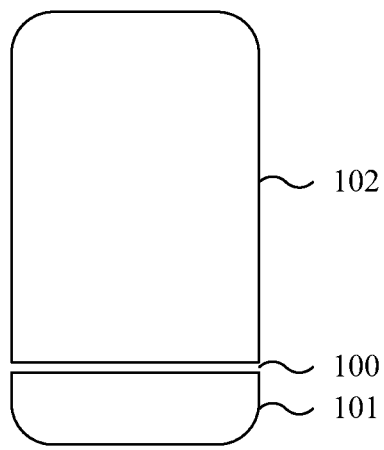
FIG. 2 is a first schematic diagram of a metal back cover of a terminal according to an embodiment of the present invention.
Figure 3:
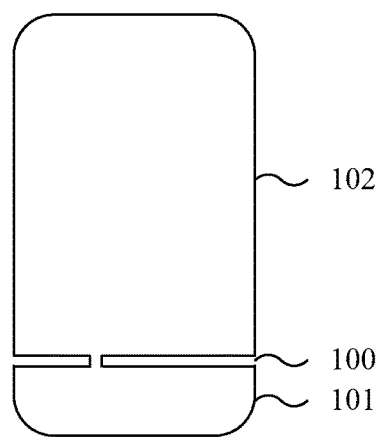
FIG. 3 is a second schematic diagram of a metal back cover of a terminal according to an embodiment of the present invention.

In a specific embodiment of the present invention, the second ground point G2 of the antenna radiator 101 may be directly grounded. During actual implementation, the second ground point G2 of the antenna radiator 101 may be directly grounded by being directly connected to a printed circuit board of the terminal, or the second ground point G2 of the antenna radiator may be directly grounded by being directly connected to the main ground part 102. That is, as shown in FIG. 2, there may be no connection point between the two parts of the metal back cover of the terminal; or as shown in FIG. 3, there may be a connection point in the slot 100 and in a position, corresponding to the second ground point G2, of the antenna radiator 101.

Figure 4:
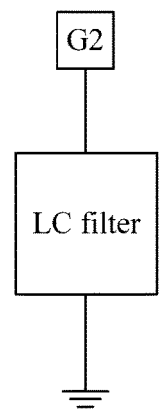
FIG. 4 is a first schematic diagram of a second ground point of a terminal antenna according to an embodiment of the present invention.
Figure 5:
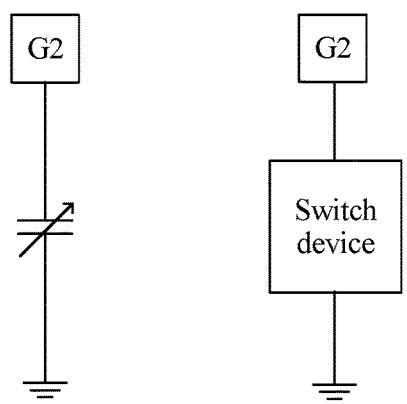
FIG. 5 is a second schematic diagram of a second ground point of a terminal antenna according to an embodiment of the present invention.

In another specific embodiment of the present invention, the second ground point G2 of the antenna radiator 101 may also be grounded by using a fixed capacitor and/or a fixed inductor. For example, as shown in FIG. 4, the second ground point G2 is grounded by using an LC filter formed by a fixed capacitor and a fixed inductor. In another specific embodiment of the present invention, the second ground point G2 of the antenna radiator 101 may also be grounded by using an adjustable device. For example, as shown in FIG. 5, the second ground point G2 is grounded by using a variable capacitor or a switch device, so that a resonance coverage area can be enlarged.

Figure 6:
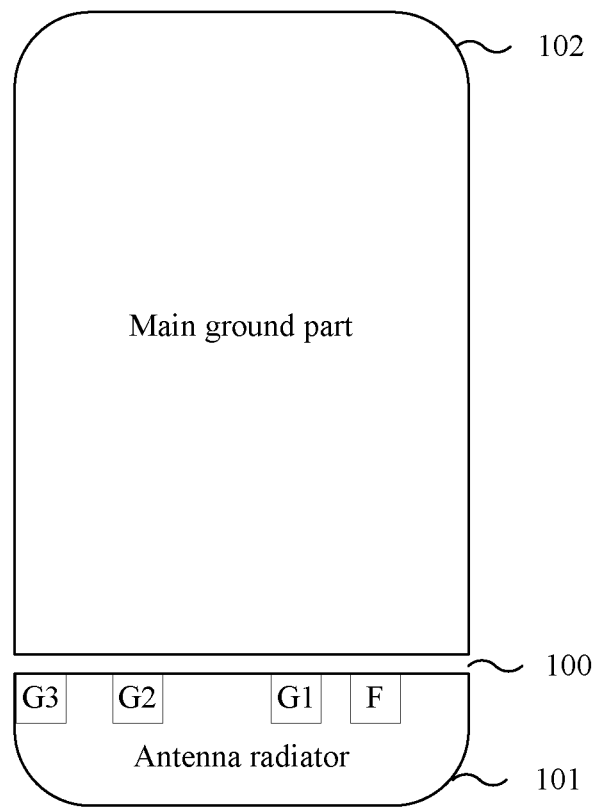
FIG. 6 is a second schematic diagram of a terminal according to an embodiment of the present invention.

Further, as shown in FIG. 6, the antenna radiator 101 may have a third ground point G3 in addition to the signal feed point F, the first ground point G1, and the second ground point G2, and the third ground point G3 is grounded. Moreover, the third ground point G3 is located in the position, corresponding to the end of the slot 100, on the antenna radiator 101.

Figure 7:
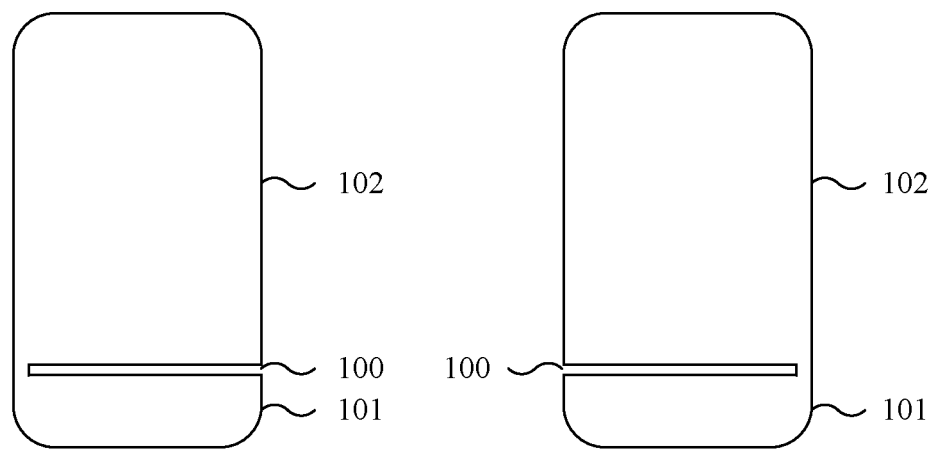
FIG. 7 is a third schematic diagram of a metal back cover of a terminal according to an embodiment of the present invention.

In a specific embodiment of the present invention, the third ground point G3 of the antenna radiator 101 may be directly grounded. During actual implementation, the third ground point G3 of the antenna radiator 101 may be directly grounded by being directly connected to the printed circuit board of the terminal, or the third ground point G3 of the antenna radiator may be directly grounded by being directly connected to the main ground part 102. That is, as shown in FIG. 7, there may be a connection point between the two parts of the metal back cover of the terminal at the end of the slot 100 and in a position, corresponding to the third ground point G3, of the antenna radiator 101.

In another specific embodiment of the present invention, the third ground point G3 of the antenna radiator 101 may also be grounded by using a fixed capacitor and/or a fixed inductor, for example, grounded by using an LC filter formed by a fixed capacitor and a fixed inductor. In another specific embodiment of the present invention, the third ground point G3 of the antenna radiator 101 may also be grounded by using an adjustable device, for example, grounded by using a variable capacitor or a switch device. This is not illustrated or described in detail herein.

Figure 8:
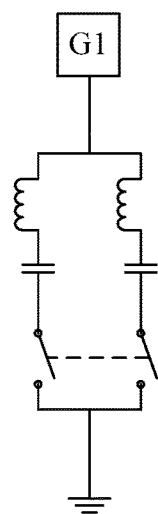
FIG. 8 is a schematic diagram of a first ground point of a terminal antenna according to an embodiment of the present invention.

Further, according to a requirement of an actual application scenario, in addition to the switch device, an inductor and a capacitor may be connected into a ground branch of the first ground point G1 of the antenna radiator 101, that is, the first ground point G1 may be specifically grounded by using the inductor and/or the capacitor, and the switch device. For example, as shown in FIG. 8, the switch device may be specifically a double-pole double-throw DPDT switch. It should be noted that the switch device in the ground branch of the first ground point G1 may be specifically the double-pole double-throw DPDT switch shown in FIG. 8, or may be a single-pole single-throw SPST switch, a single-pole double-throw SPDT switch, a single-pole four-throw SP4T switch, or the like. This is not specifically limited by the present invention.

When the switch device in the ground branch of the first ground point G1 of the antenna radiator 101 is off and the first ground point G1 is in an open circuit, the terminal antenna is in a low-frequency operating state. When the switch device in the ground branch of the first ground point G1 of the antenna radiator 101 is on and the first ground point G1 is short-circuited to ground, the terminal antenna is in a high-frequency operating state. That is, an operating status of the terminal antenna can be controlled by controlling a status of the switch device in the ground branch of the first ground point G1 of the antenna radiator 101.

The matching network connected to the signal feed point F of the antenna radiator 101 includes a capacitor, and may further include an inductor. During specific implementation, the matching network may be a variable capacitor, so as to facilitate impedance matching.

The terminal provided by the present invention is described in the following with reference to the accompanying drawings by using specific embodiments as examples.

Embodiment 1

Figure 9:
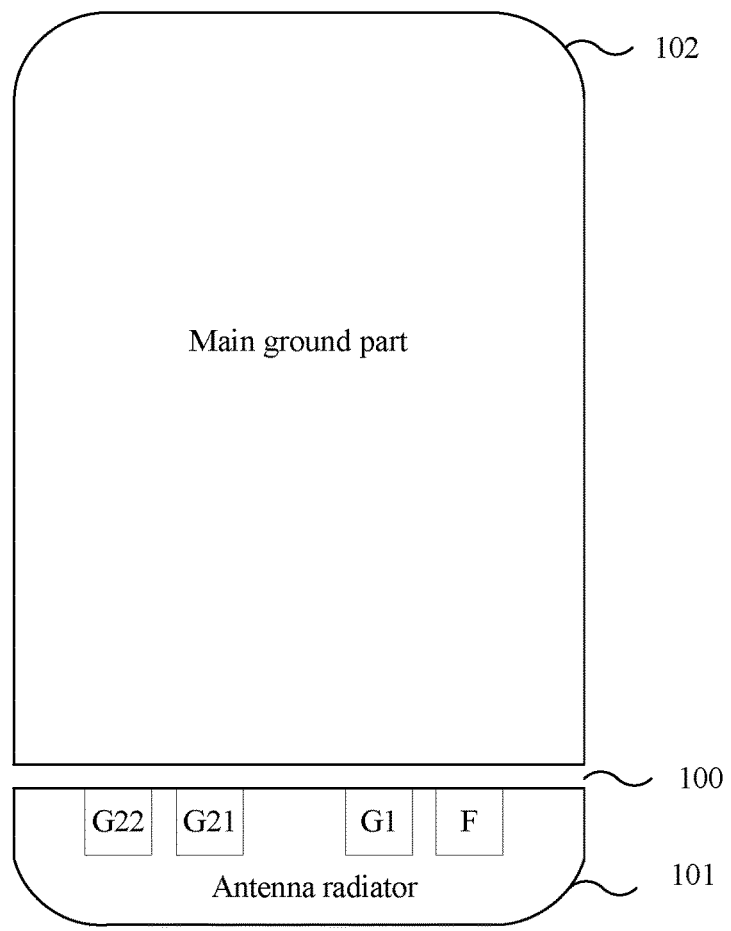
FIG. 9 is a schematic diagram of a terminal according to Embodiment 1 of the present invention.

A terminal provided by Embodiment 1 of the present invention is shown in FIG. 9. There is no connection point between two parts of a metal back cover of the terminal. An antenna radiator 101 has a signal feed point F, a first ground point G1, and two second ground points G21 and G22. The signal feed point F is connected to a variable capacitor, the first ground point G1 is grounded by using a double-pole double-throw DPDT switch, and the two second ground points G21 and G22 are both directly grounded. During specific implementation, the first ground point G1 may be grounded by being connected to a printed circuit board of the terminal by using the double-pole double-throw DPDT switch. The second ground point G21 may be grounded by being connected to the printed circuit board of the terminal. The second ground point G22 of a terminal antenna may be grounded by being connected to a main ground part 102 of the metal back cover of the terminal by using a mechanical part.

When the double-pole double-throw DPDT switch in a ground branch of the first ground point G1 of the antenna radiator 101 is off and the first ground point G1 is in an open circuit, the terminal antenna is in a low-frequency operating state. In this case, the signal feed point F and the two second ground points G21 and G22 are short-circuit points, two ends of the slot 100 are open-circuit points, and the following resonances may be formed in the terminal antenna:

1. A resonance in a left-handed mode is formed between a distributed inductor between the signal feed point F and a closest short-circuit point, that is, the second ground point G21, and a variable capacitor connected to the signal feed point F, and a resonance frequency is $f_{l1}$.

A value of the resonance frequency $f_{l1}$ may be adjusted by adjusting a distance between the signal feed point F and the second ground point G21. A larger distance between the signal feed point F and the second ground point G21 leads to a smaller resonance frequency $f_{l1}$, and a smaller distance between the signal feed point F and the second ground point G21 leads to a larger resonance frequency $f_{l1}$.

2. A resonance in a slot mode is formed between a left end of the slot 100 and a closest short-circuit point, that is, the second ground point G22, and a resonance frequency is $f_{l2}$ and corresponds to ¼ of a guided-wave wavelength. The guided-wave wavelength is a signal wavelength of a central frequency of expected bandwidth of the terminal antenna.

A value of the resonance frequency $f_{l2}$ may be adjusted by adjusting a distance between the left end of the slot 100 and the second ground point G22. A larger distance between the left end of the slot 100 and the second ground point G22 leads to a smaller resonance frequency $f_{l2}$, and a smaller distance between the left end of the slot 100 and the second ground point G22 leads to a larger resonance frequency $f_{l2}$.

3. A resonance in the slot mode is formed between the signal feed point F and the second ground point G22, and a resonance frequency is $f_{l3}$ and corresponds to ½ of the guided-wave wavelength.

A value of the resonance frequency $f_{l3}$ may be adjusted by adjusting a distance between the signal feed point F and the second ground point G22. A larger distance between the signal feed point F and the second ground point G22 leads to a smaller resonance frequency $f_{l3}$, and a smaller distance between the signal feed point F and the second ground point G22 leads to a larger resonance frequency $f_{l3}$.

4. A resonance in the slot mode is formed between a right end of the slot 100 and a closest short-circuit point, that is, the signal feed point F, and a resonance frequency is $f_{l4}$ and corresponds to ¼ of the guided-wave wavelength.

A value of the resonance frequency $f_{l4}$ may be adjusted by adjusting a distance between the right end of the slot 100 and the signal feed point F. A larger distance between the right end of the slot 100 and the signal feed point F leads to a smaller resonance frequency $f_{l4}$, and a smaller distance between the left end of the slot 100 and the signal feed point F leads to a larger resonance frequency $f_{l4}$.

That is, in the low-frequency operating state, the terminal antenna has one resonance point in the left-handed mode and three resonance points in the slot mode.

When the double-pole double-throw DPDT switch in the ground branch of the first ground point G1 of the antenna radiator 101 is on and the first ground point G1 is short-circuited to ground, the terminal antenna is in a high-frequency operating state. In this case, the signal feed point F, the first ground point G1, and the two second ground points G21 and G22 are all short-circuit points, the two ends of the slot 100 are open-circuit points, and the following resonances may be formed in the terminal antenna:

1. A resonance in the left-handed mode is formed between a distributed inductor between the signal feed point F and a closest short-circuit point, that is, the first ground point G1, and the variable capacitor connected to the signal feed point F, and a resonance frequency is $f_{h1}$.

A value of the resonance frequency $f_{h1}$ may be adjusted by adjusting a distance between the signal feed point F and the first ground point G1. A larger distance between the signal feed point F and the first ground point G1 leads to a smaller resonance frequency $f_{h1}$, and a smaller distance between the signal feed point F and the first ground point G1 leads to a larger resonance frequency $f_{h1}$.

2. A resonance in the slot mode is formed between the signal feed point F and the second ground point G22, and a resonance frequency is $f_{h2}$ and corresponds to ½ of the guided-wave wavelength.

A value of the resonance frequency $f_{h2}$ may be adjusted by adjusting a distance between the signal feed point F and the second ground point G22. A larger distance between the signal feed point F and the second ground point G22 leads to a smaller resonance frequency $f_{h2}$, and a smaller distance between the signal feed point F and the second ground point G22 leads to a larger resonance frequency $f_{h2}$.

3. A resonance in the slot mode is formed between the left end of the slot 100 and a closest short-circuit point, that is, the second ground point G22, and a resonance frequency is $f_{h3}$ and corresponds to ¼ of the guided-wave wavelength.

A value of the resonance frequency $f_{h3}$ may be adjusted by adjusting a distance between the left end of the slot 100 and the second ground point G22. A larger distance between the left end of the slot 100 and the second ground point G22 leads to a smaller resonance frequency $f_{h3}$, and a smaller distance between the left end of the slot 100 and the second ground point G22 leads to a larger resonance frequency $f_{h3}$.

4. A resonance in the slot mode is formed between the right end of the slot 100 and a closest short-circuit point, that is, the signal feed point F, and a resonance frequency is $f_{h4}$ and corresponds to ¼ of the guided-wave wavelength.

A value of the resonance frequency $f_{h4}$ may be adjusted by adjusting a distance between the right end of the slot 100 and the signal feed point F. A larger distance between the right end of the slot 100 and the signal feed point F leads to a smaller resonance frequency $f_{h4}$, and a smaller distance between the right end of the slot 100 and the signal feed point F leads to a larger resonance frequency $f_{h4}$.

That is, in the high-frequency operating state, the terminal antenna can also have one resonance point in the left-handed mode and three resonance points in the slot mode.

During actual implementation, specific positions of the signal feed point F, the first ground point G1, and the two second ground points G21 and G22 of the antenna radiator 101 may be set according to a requirement of an actual application scenario.

For example, when the signal feed point F is 8.3 mm distant from the right end of the slot 100, the second ground point G21 is 30 mm distant from the left end of the slot 100, the second ground point G22 is 20.8 mm distant from the left end of the slot 100, and a change range of the variable capacitor connected to the signal feed point F is 0.7 pF-2.7 pF, the terminal antenna can achieve 1710 MHz-2700 MHz full-band coverage.

Embodiment 2

Figure 10:
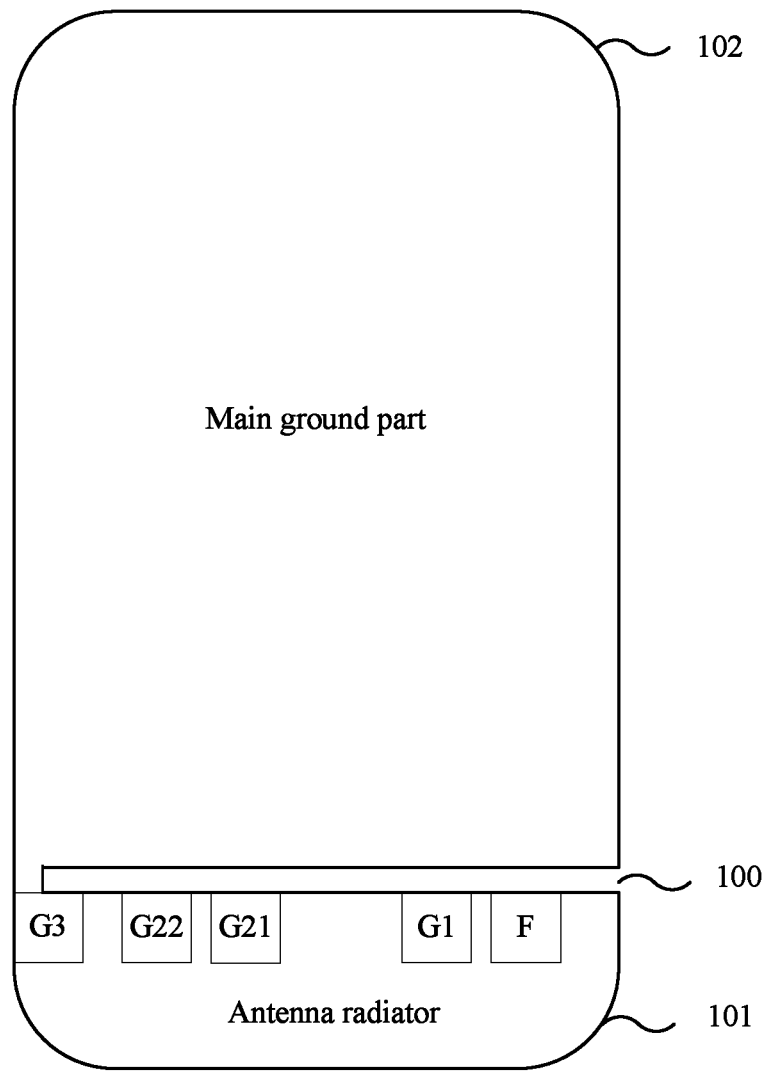
FIG. 10 is a schematic diagram of a terminal according to Embodiment 2 of the present invention.

A terminal provided by Embodiment 2 of the present invention is shown in FIG. 10. Compared with the terminal in FIG. 9 of Embodiment 1, a difference lies in that there is a connection point that is between the two parts of the metal back cover of the terminal and that is at the left end of the slot 100. Due to existence of the connection point, this is equivalent to that the antenna radiator 101 has an additional third ground point G3 that is directly grounded. In this case, a resonance in a slot mode that is formed between the left end of the slot 100 and the second ground point G22 corresponds to ½ of a guided-wave wavelength.

Further, a ground point that is grounded by using an adjustable device may be further added between the left end of the slot 100 and the second ground point G22, and an electrical length between the left end of the slot 100 and the second ground point G22 can be changed, so as to adjust the resonance in the slot mode and change a resonance frequency.

In summary, with use of the terminal provided by the embodiments of the present invention, no matter whether a terminal antenna is in a low-frequency or high-frequency operating state, the terminal antenna can have four resonance points: one resonance point in a left-handed mode and three resonance points in a slot mode. Compared with the prior art, bandwidth of the terminal antenna can be extended, and performance of the terminal antenna can be improved.

Persons skilled in the art should understand that although preferred embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present invention.

Obviously, persons skilled in the art can make various modifications and variations to the embodiments of the present invention without departing from the spirit and scope of the embodiments of the present invention. The present invention is intended to cover these modifications and variations provided that they fall within the scope of protection defined by the following claims and their equivalent technologies.

What is claimed is:

1. A terminal, wherein a metal back cover of the terminal includes a slot that divides the metal back cover into two parts, and one of the two parts is used as an antenna radiator of the terminal; wherein the antenna radiator includes a signal feed point, a first ground point, and at least one second ground point, so that an antenna of the terminal has four resonance points, wherein
the signal feed point is connected to a matching network, the first ground point is grounded by a switch device, and the second ground point is grounded; and a distance between the signal feed point and the first ground point is less than a distance between the signal feed point and the second ground point, and none of the signal feed point, the first ground point, and the second ground point is located in a position, corresponding to an end of the slot, on the antenna radiator.

2. The terminal according to claim 1, wherein the second ground point of the antenna radiator is grounded by an adjustable device.

3. The terminal according to claim 1, wherein the second ground point of the antenna radiator is grounded by a fixed capacitor.

4. The terminal according to claim 1, wherein the second ground point of the antenna radiator is grounded by a fixed inductor.

5. The terminal according to claim 1, wherein the antenna radiator further includes a third ground point, the third ground point is grounded, and the third ground point is located in the position, corresponding to the end of the slot, on the antenna radiator.

6. The terminal according to claim 5, wherein the third ground point of the antenna radiator is grounded by an adjustable device.

7. The terminal according to claim 5 wherein the third ground point of the antenna radiator is grounded by a fixed capacitor.

8. The terminal according to claim 5 wherein the third ground point of the antenna radiator is grounded by a fixed inductor.

9. The terminal according to claim 1, wherein the first ground point of the antenna radiator is grounded by a capacitor and the switch device.

10. The terminal according to claim 1, wherein the first ground point of the antenna radiator is grounded by an inductor and the switch device.

11. The terminal according to claim 1, wherein the matching network connected to the signal feed point of the antenna radiator includes a variable capacitor.

* * * * *